(No Model.)
D. T. JONES.
SULKY ATTACHMENT FOR WALKING PLOWS.
No. 389,705. Patented Sept. 18, 1888.
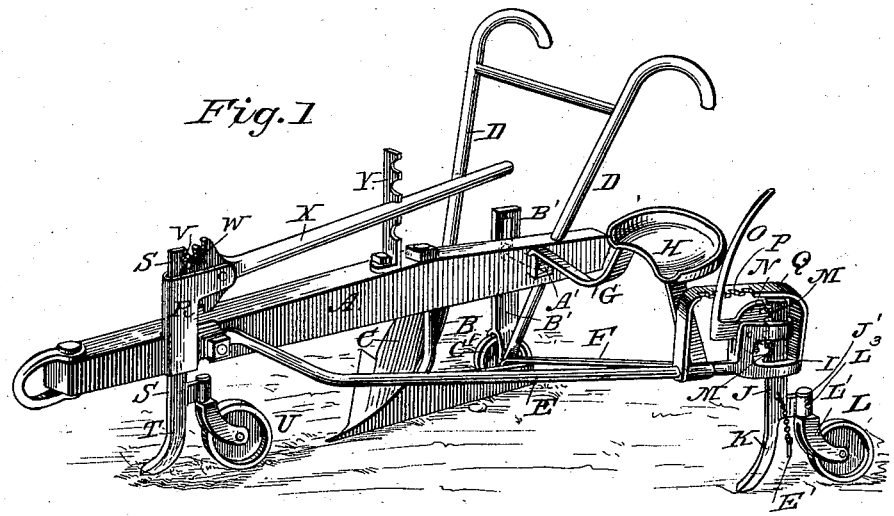
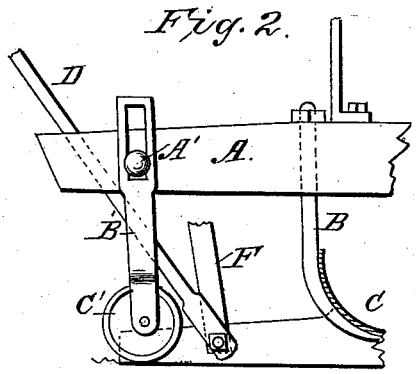
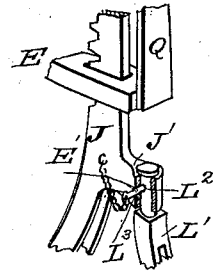
WITNESSES:
INVENTOR:
Daniel T. Jones
BY Munn & Co
ATTORNEYS.

United States Patent Office.

DANIEL T. JONES, OF WATERBURY, DAKOTA TERRITORY, ASSIGNOR OF ONE-HALF TO ABRAM N. HILL, OF SAME PLACE.

SULKY ATTACHMENT FOR WALKING-PLOWS.

SPECIFICATION forming part of Letters Patent No. 389,705, dated September 18, 1888.

Application filed April 4, 1887. Renewed August 22, 1888. Serial No. 283,513. (No model.)

*To all whom it may concern:*

Be it known that I, DANIEL T. JONES, of Waterbury, in the county of Jerauld, Dakota Territory, have invented a new and useful Improvement in Sulky Attachments for Walking-Plows, of which the following is a specification.

My invention consists in an improved sulky attachment for ordinary walking-plows, which will be hereinafter fully described and claimed.

Referring to the accompanying drawings, Figure 1 is a perspective view showing my improved attachment secured in operative position to a walking-plow of ordinary construction. Fig. 2 is a detail side elevation, and Fig. 3 is a detail perspective view.

The same letters of reference indicate corresponding parts in all the figures.

Referring to the several parts by letter, A indicates the beam, B the standards, C the shovel or blade, and D the handles, of a walking-plow of ordinary construction, to which my improved sulky attachment is shown as applied.

E indicates the frame-piece of the attachment, which consists of a curved bar, the forward end of which is bolted to the landside of the plow-beam near the forward end thereof, while it is connected near its rear end to the plow proper by the brace F and the brace G, which latter supports the driver's seat H. The rear end of this frame-piece is formed with a vertical opening, I, through which slides a standard, J, which carries at its lower end the caster-wheel L and the shovel-blade K, arranged directly in front of the said wheel, as shown, the upper forward side of the standard J being formed with the teeth M, with which mesh the teeth on the segmental edge of a cam, N, which is pivoted upon the rear end of the frame-piece, and which is provided with a handle, O, which extends up within convenient reach of the driver's seat, and which may be engaged with any one of a series of notches, P, in a stop-rail, Q, by which arrangement the standard may be raised and lowered to adjust it at any height desired.

To the land side of the plow-beam, near the forward end thereof, is bolted, by the same bolt which secures the forward end of the frame-piece E, a bearing-piece, R, in which slides a standard, S, carrying at its lower end a caster-wheel, U, and a shovel-blade, T, arranged directly in front of the said wheel, as shown, the standard S having its forward rear edge formed with a series of teeth, V, which mesh with the teeth on the segmental edge of a cam, W, which is pivoted in an extension of the bearing-piece R, and which is formed with a long handle, X, which extends back within convenient reach of the driver's seat, and which may be engaged with any one of a series of notches in a vertical bar, Y, which is bolted at its lower end upon the plow-beam, as shown.

To the furrow side of the plow, in line with the driver's seat, is adjustably secured, by a set-screw or bolt, A', passing through the vertical slot in its upper end, a standard, B', in the lower bifurcated end of which is journaled a roller, C', as shown.

My improved sulky attachment can be attached to any ordinary walking-plow, the entire attachment, with the exception of the roller C', which runs in the furrow, being on the land side of the plow, the wheels being adjusted vertically so as to cause the plow to run perfectly even, the shovel-blades K and T being directly in front of the caster-wheels L and U, and operating to clear a smooth track for the said wheels to travel in, thus removing any obstruction which might tend to tilt or throw the plow-blade out of the ground.

By the use of my improved attachment any ordinary walking-plow can be converted into a sulky-plow having superior advantages over those now in use in the smoothness and evenness with which it operates.

The upper end of the bracket $L'$, in which the rear caster-wheel, L, is journaled, has a transverse aperture, $L^2$, formed through it, and a similar aperture, $L^3$, is formed in the bearing J' at the lower rear end of the standard J, in which the upper end of the bracket $L'$ is swiveled, and when it is desired to hold this caster-wheel "stiff" and prevent it turning on its swivel while finishing up a land, a pin, E', which is secured by a short chain to the side of the standard, is inserted through these registering apertures in the bracket and bearing, thus locking the wheel in the desired position.

Having thus described my invention, what I claim, and desire to secure by Letters Patent, is—

1. The combination, with a supporting-frame, of the standard carrying at its lower end the shovel-blade and having a rear socket and the caster-wheels journaled in said socket, substantially as shown and described.

2. The improved attachment consisting of the curved frame-piece, the lower brace and the upper brace carrying the seat, the standards having the caster-wheels and the shovel-blades arranged directly in front of the said wheels at their lower ends, means, substantially as described, for adjusting the said standards, and the adjustable standard carrying the roller at its lower end, substantially as and for the purpose herein set forth.

3. The combination, with a walking-plow of ordinary construction, of the curved frame-piece, the lower brace, and upper brace carrying the seat, the standards having the caster-wheels, and the shovel-blades arranged directly in front of the said wheels at their lower ends, and having the teeth formed on their upper portions, the toothed cams having the handles, and the notched bars with which the said handles engage, and the adjustable standard carrying the roller in its lower bifurcated end, all constructed and arranged to operate substantially in the manner and for the purpose herein set forth.

4. The combination, in a sulky attachment, of the frame, the standard having a shovel-blade, K, and provided with a vertical bearing, J′, and a pin-opening, L³, registering with a similar opening in the shank of the caster-wheel, and the caster-wheel, the caster-wheel and shovel standard or support being adjustably connected with the framing, substantially as set forth.

DANIEL T. JONES.

Witnesses:
THOMAS G. CLARK,
E. S. WATERBURY.